S. NEWBOLD.
INSERTIBLE TOOTH FOR METAL CUTTING SAWS OR TOOLS.
APPLICATION FILED FEB. 23, 1910.

994,331.

Patented June 6, 1911.

WITNESSES

INVENTOR
Sidney Newbold.
BY
ATTORNEYS

UNITED STATES PATENT OFFICE.

SIDNEY NEWBOLD, OF PHILADELPHIA, PENNSYLVANIA.

INSERTIBLE TOOTH FOR METAL-CUTTING SAWS OR TOOLS.

994,331.  Specification of Letters Patent.  Patented June 6, 1911.

Application filed February 23, 1910. Serial No. 545,363.

*To all whom it may concern:*

Be it known that I, SIDNEY NEWBOLD, a citizen of the United States, residing in the city and county of Philadelphia, State of Pennsylvania, have invented a new and useful Insertible Tooth for a Metal-Cutting Saw or Tool, of which the following is a specification.

My invention relates to a metal-cutting saw or tool in which the teeth employed may be removed in order to be reground or replaced by new ones and it consists in constructing cutters and holders therefor, whereby they are prevented from being pushed out sidewise from the saw or tool, and the possibility of stripping the threads of the adjusting screws employed is eliminated; the cutters may be adjusted with nicety and precision and in a convenient manner, and a greater wearing action of the device is attained. To this end, I employ holders for the cutters and adapt the latter to be adjusted by nuts which are interposed between the cutters and the bases of the holders, said nuts being engageable by screws or bolts, which pass freely through the bases of the holders and have their heads seated on the base of the pockets in which the holders are located, as will be hereinafter more fully set forth.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1:
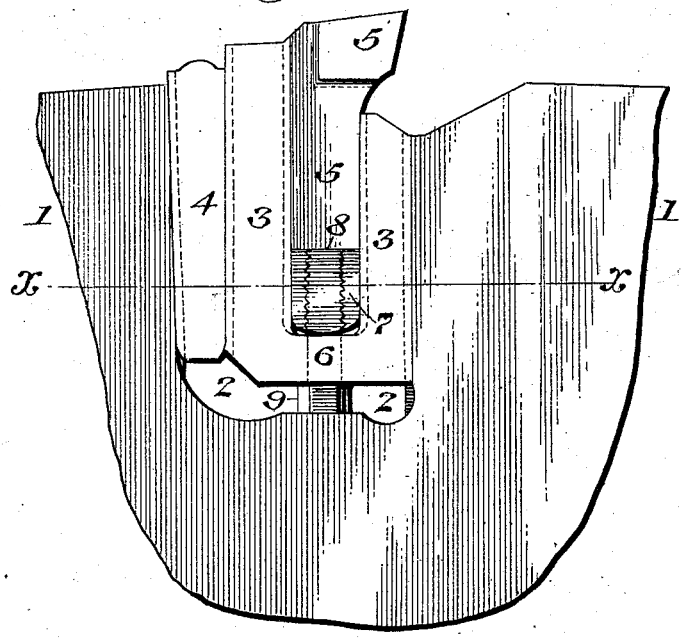
Figure 2:

Figure 1 represents a side elevation of a portion of a metal cutting saw or tool and of an insertible tooth embodying my invention applied thereto. Fig. 2 represents a section of a portion on line x—x Fig. 1.

Similar numerals of reference indicate corresponding parts in the figures.

Referring to the drawings:—1 designates a portion of a blade of a metal-cutting saw the same having at its peripheral portion a cavity or pocket 2, in which is fitted the U-shaped holder 3, and a wedge shaped key 4, said holder receiving within the recess formed by the parallel sides of said U-shaped holder the shank of the tooth or cutter 5 which is adapted to be guided between said parallel sides and moved in and out for the purpose of adjustment of its working edge, as will be hereinafter more fully explained. The key 4 occupies a position between the one side of the holder 3 and the adjacent side wall of the pocket it being noticed that the several members are provided with tongues or grooves respectively, whereby they are interlocked and well enabled to retain their position and are readily removable and applicable from and to the saw. Interposed between the shank of the cutter and the base member 6 is a nut 7, in which is fitted the screw 8, a portion of the latter being unthreaded and freely occupying said base member, the head 9 of said screw being below said member and resting freely on the adjacent base of the pocket 2.

The operation is as follows:—When the movable parts are in position in the pocket, the screw 8 is rotated whereby, by the swiveling action of the same, the cutter is moved out so that its point or cutting edge may be adjusted with nicety and precision relatively to the desired extent of projection from the circumference of the saw or its center. The key 4 is then driven fully into position, whereby the holder is tightened against the opposite wall of said pocket, while the arms of the holder are pressed firmly against the sides of the nut 7, by which provisions the cutter is firmly contained in the holder and the latter tightly held in the pocket, whereby the cutter will not push out laterally, and the threads of the screw 8 are prevented from being stripped when the saw or tool is in operation, it being seen also that the head 9 of the screw rests on the base of the pocket 2, and avoids piercing or perforating the latter, to receive said screw and furthermore, the holder and the cutter are well seated in position and they cannot be forced downwardly or inwardly into the pocket beyond the extent to which they are positioned, and they are firmly supported so as to remain stationary under all circumstances, especially when the saw is in use.

The saw or tool will be provided with as many pockets and consequently teeth and holding members therefor as may be desired.

Having thus described my invention what I claim as new and desire to secure by Letters Patent, is:—

1. In an insertible tooth for a metal-cutting saw or tool, a saw blade formed with a pocket, a holder in such pocket, a cutter freely fitted therein, a wedging member between said pocket and holder, a nut occupying said holder between adjacent end portions of the same and said cutter, and a screw in said holder adapted to engage said nut.

2. In an insertible tooth for a metal-cutting saw or tool, a saw blade formed with a pocket, a holder in such pocket, a cutter adjustably fitted thereto, a wedging member between said pocket and holder, a nut interposed between said cutter and holder, and a screw fitted in said nut passing freely through the base of said holder and being seated on the wall of the pocket in the portion of the saw or tool which is occupied by said holder.

3. In an insertible tooth for a metal-cutting saw or tool, a saw blade formed with a pocket, a holder in such pocket, a cutter freely fitted therein, a wedging member between said pocket and holder, a nut occupying said holder between adjacent end portions of the same and said cutter and a screw in said holder adapted to engage said nut, the head of said screw being freely seated on the base wall of the pocket of the saw or tool in which said holder is retained.

4. In a device of the character stated, a saw blade formed with a pocket, a substantially U-shaped holder in said pocket and having parallel sides, a tooth fitted within the parallel sides of the recess therein and longitudinally movable in the same, means between said tooth and holder for longitudinally adjusting the former in the recess of the latter, and means for securing the holder in the pocket and for clamping the tooth in the holder.

5. In a device of the character stated, a substantially U-shaped holder, a screw having smooth bearing through the bottom of the same, and a tooth longitudinally movable in said holder and connected to be longitudinally adjusted in the same by such screw.

6. In a device of the character stated, a substantially U-shaped holder, a screw having smooth bearing through the bottom of the same, a tooth longitudinally movable in the holder, and a nut bearing against the inner end of the tooth and engaged by the screw.

7. In a device of the character stated, a substantially U-shaped holder, a tooth guided to be longitudinally movable in the same, a nut bearing against the end of the shank of the tooth and guided to be longitudinally movable in the holder, and a screw having smooth bearing in the bottom of the holder and engaging the nut.

8. In a device of the character stated, a saw blade formed with a pocket, a U-shaped holder in said pocket, a key between one side of said holder and the side of the pocket, a screw having a smooth bearing in the bottom of the holder and having a head at its outer end forming a rigid abutment against the bottom of the pocket, and a tooth longitudinally movable in the holder and connected to be longitudinally adjusted by the screw.

9. In a device of the character stated, a saw blade formed with a pocket, a U-shaped holder having one edge guided against one side of the pocket, a wedge-key between the holder and the other side of the pocket, a tooth longitudinally movable in the holder, a nut bearing against the tooth and longitudinally movable in the holder, and a screw having smooth bearing in the bottom of the holder and engaging the nut and having its head forming an abutment between the holder and the bottom of the pocket.

SIDNEY NEWBOLD.

Witnesses:
JOHN A. WIEDERSHEIM,
WM. CANER WIEDERSEIM.

---

Copies of this patent may be obtained for five cents each, by addressing the "Commissioner of Patents, Washington, D. C."